Feb. 16, 1943.   E. A. ROCKWELL   2,311,576
BOOSTER SYSTEM
Original Filed June 27, 1935   5 Sheets-Sheet 1
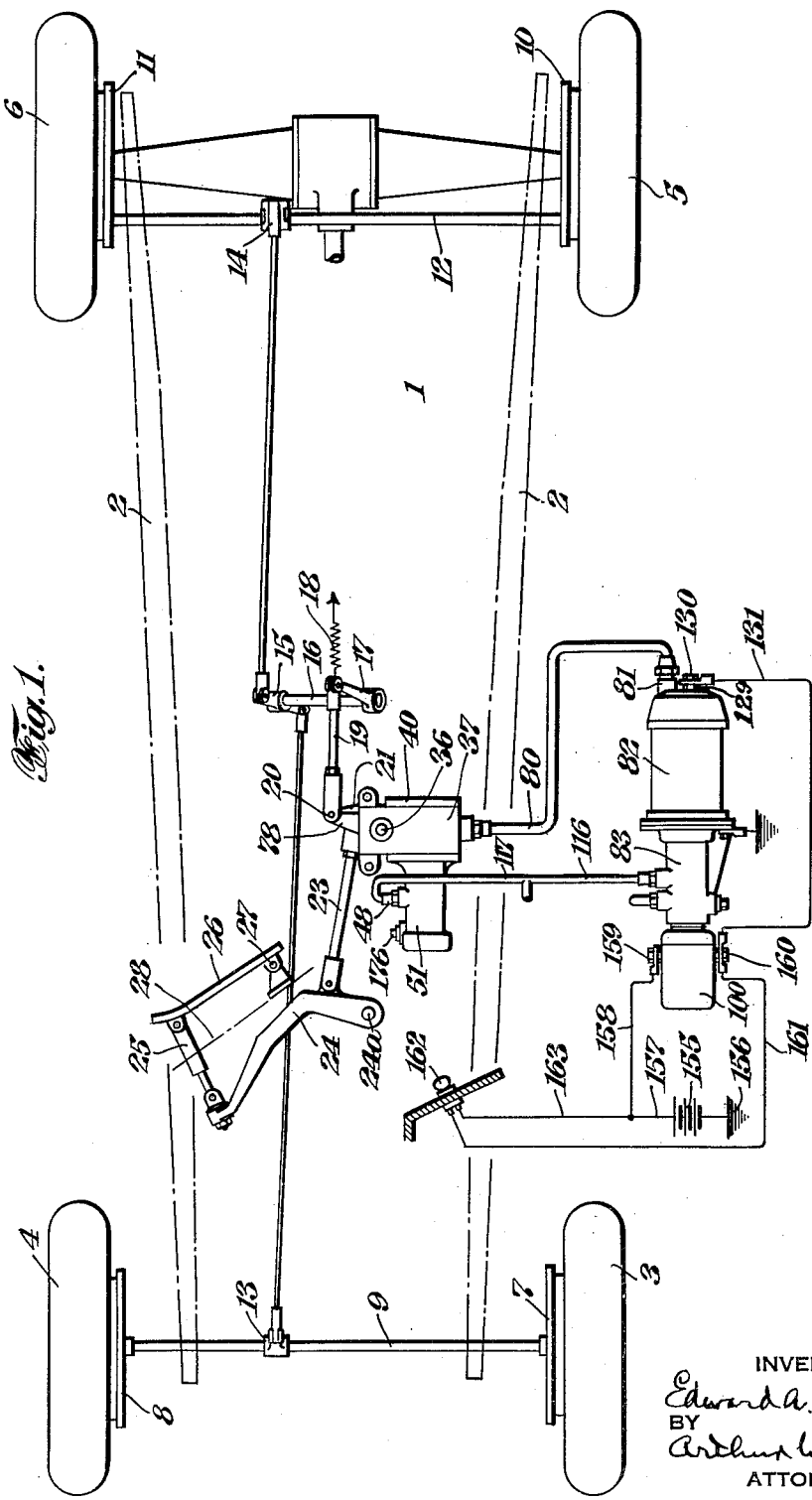
INVENTOR
Edward A. Rockwell
BY
Arthur Wright
ATTORNEY

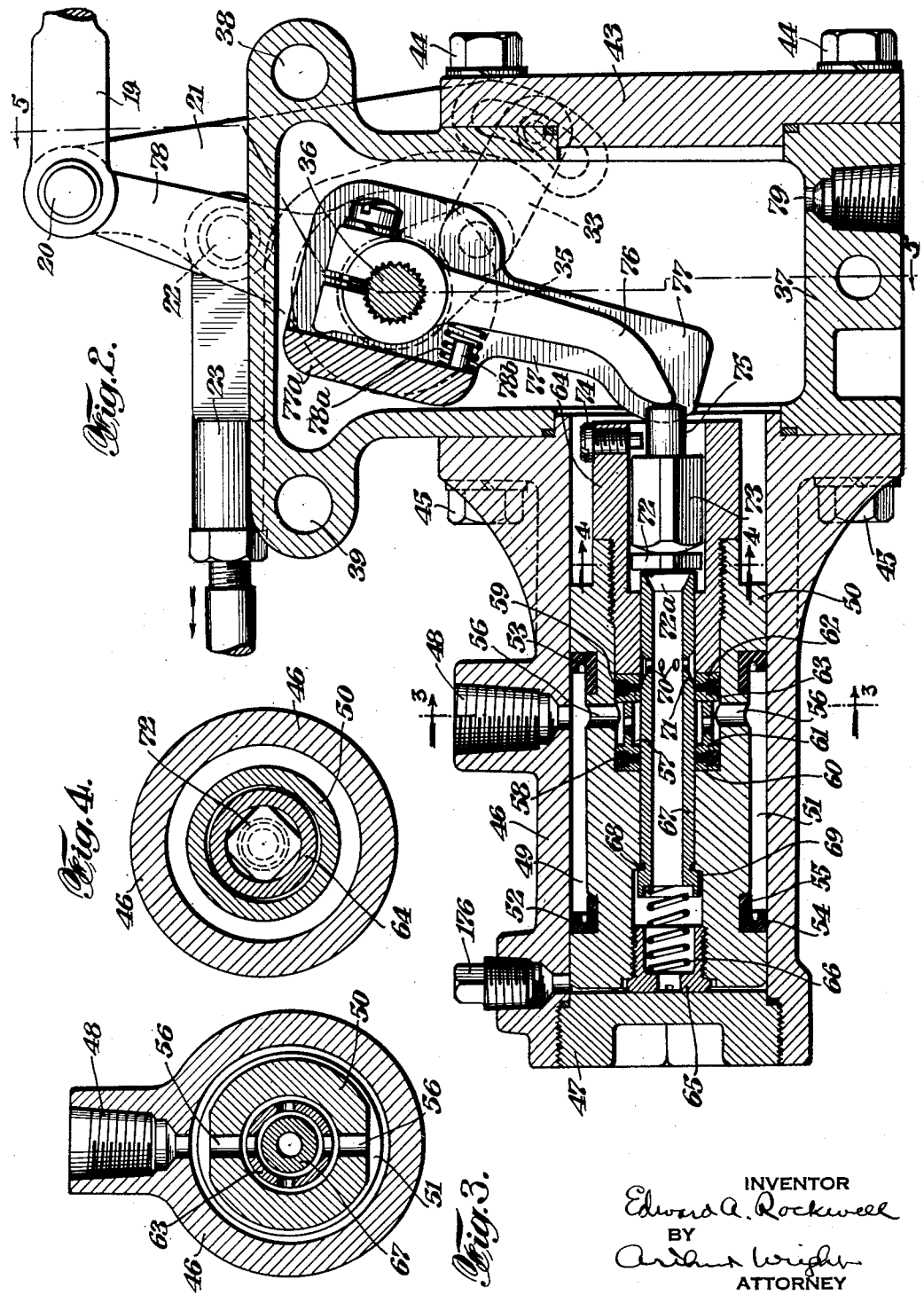

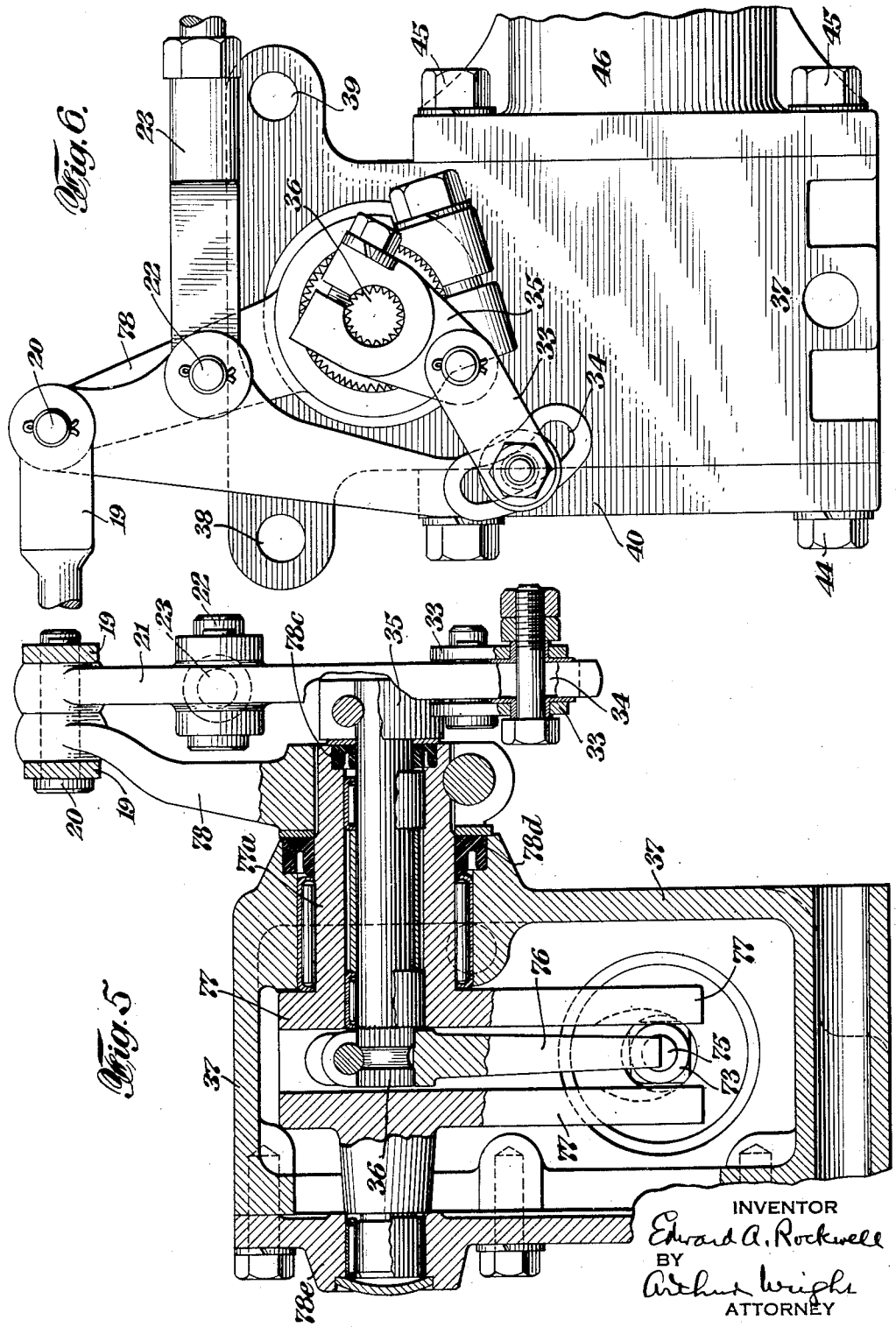

Feb. 16, 1943.  E. A. ROCKWELL  2,311,576
BOOSTER SYSTEM
Original Filed June 27, 1935   5 Sheets-Sheet 4
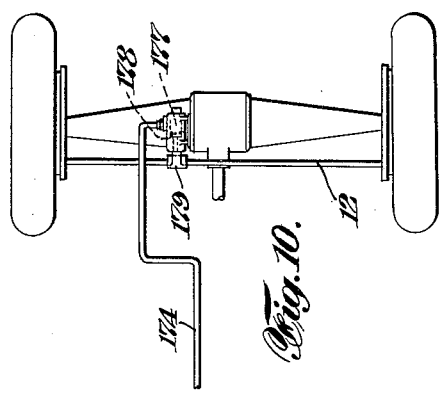
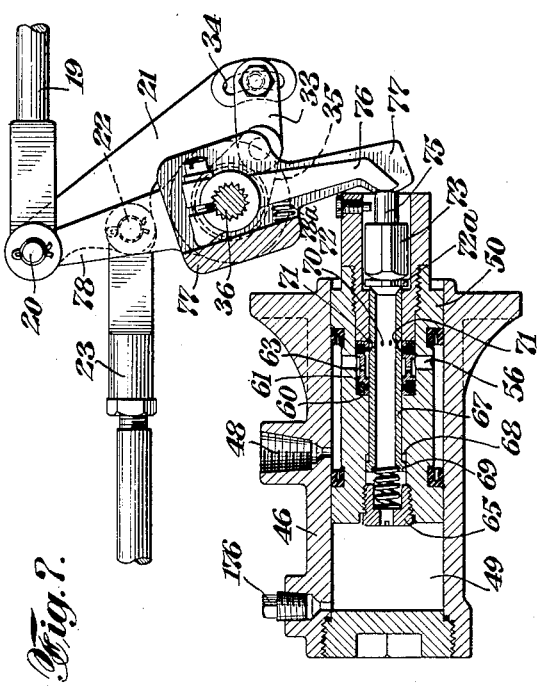
INVENTOR
Edward A. Rockwell
BY
Arthur Wright
ATTORNEY Feb. 16, 1943.    E. A. ROCKWELL    2,311,576
BOOSTER SYSTEM
Original Filed June 27, 1935    5 Sheets-Sheet 5
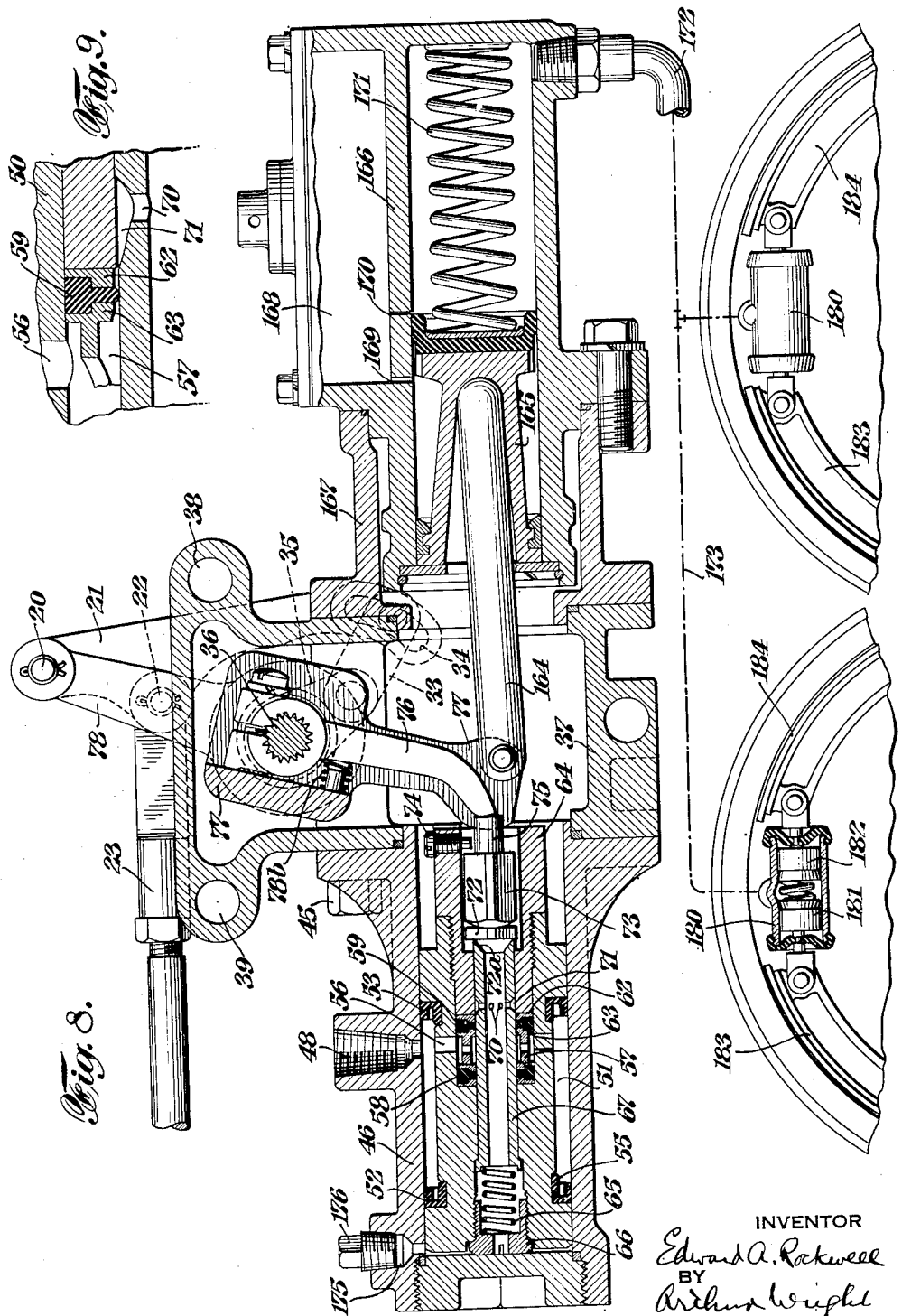
INVENTOR
Edward A. Rockwell
BY
Arthur Wright
ATTORNEY Patented Feb. 16, 1943

2,311,576

UNITED STATES PATENT OFFICE 2,311,576

BOOSTER SYSTEM

Edward A. Rockwell, Forest Hills, N. Y., assignor to General Auto Parts Corporation, a corporation of Delaware Application October 12, 1938, Serial No. 234,637, now Patent No. 2,265,817, dated December 9, 1941, which is a division of application Serial No. 28,699, June 27, 1935, now Patent No. 2,136,638, dated November 15, 1938. Divided and this application January 4, 1940, Serial No. 312,357. In Great Britain June 11, 1936

13 Claims. (Cl. 121—41)

My invention relates particularly to a valve and booster system by means of which modulated hydraulic pressure can be obtained for the operation of accessories for automotive vehicles and other power installations.

This is a divisional application of my application upon Valve and booster system, Ser. No. 234,637, filed October 12, 1938, Patent No. 2,265,- 817, granted December 9, 1941, which is a division of my application upon Electro flow power supply systems, Ser. No. 28,699, filed June 27, 1935, Patent No. 2,136,638, granted November 15, 1938.

The object of my invention is to provide a valve and booster apparatus so as to provide an effective system for the supply of power wherever desired but particularly in connection with automobiles as, for instance, in the operation of automobile accessories. By means of my invention the different accessories of an automobile may be effectively operated by power in addition to the manual power applied thereto, but coordinated in extent to the manual pressure applied. It is particularly useful in connection with the operation of automobile brakes of any desired character, whether mechanical power brakes or hydraulically operated brakes. A further object is to provide a liquid medium for transmitting the additional power, and which is controlled by the presence of sealing rings carried by the relatively moving parts. The rings are so constructed as to be unaffected by the liquid used, and preserve completely-tight joints without leakage and without the interposition of springs.

My apparatus, furthermore, is based on the use of a liquid under pressure, which is, however, utilized at any given time, in only small amounts of the liquid, but which has a storage capacity under pressure so that there is no appreciable lag in the operation of the apparatus. Also, there is used a system of valve seals permitting the use of a low viscosity liquid.

Further objects of my invention will appear from the detailed description of the same hereinafter.

While my invention is capable of being carried out in many different ways, for the purpose of illustration I have shown only certain forms of my invention in the accompanying drawings, in which—

Fig. 1 is a diagrammatic view of an automobile equipped with my invention as applied to the operation of brakes;

Fig. 2 is a vertical section, enlarged, showing the booster unit for the brake;

Fig. 3 is a vertical section of the same taken on line 3—3;

Fig. 4 is another vertical section of the same taken on line 4—4;

Fig. 5 is a transverse vertical section showing the booster unit partly in section;

Fig. 6 is an end elevation showing the said booster unit;

Fig. 7 is a similar view showing the position of the levers after the boosting power has been applied and the parts have come to a static position with the pressure of the booster balanced against the foot pressure;

Fig. 8 is a vertical section of the booster unit shown as applied to the operation of the hydraulic brake system;

Fig. 9 is an enlarged section showing the position of the valve in the booster when closed; and Fig. 10 shows the arrangement for connecting the rear wheel brakes to the forward end of the booster cylinder.

Referring to the mechanically operated system for operating a brake, I have shown, in Fig. 1, an automobile 1 having a frame 2 for connection in the usual way with front wheels 3 and 4 and rear wheels 5 and 6. The front wheels 3 and 4 are provided with brakes 7 and 8, of any desired type, which are operated by a cross-shaft 9. Similarly, the rear wheels 5 and 6 are provided with brakes 10 and 11 of any desired type, which are operated by a cross-shaft 12. The shafts 9 and 12 are provided with operating levers 13 and 14, respectively, which lead to the opposite ends of a rocker lever 15 carried near the center thereof upon a cross-shaft 16, on one end of which there is an operating lever 17. The lever 17, at its end, is provided with a pull-back spring 18 fastened to the frame 2 in any desired way, and a link 19 which leads to a pivot 20. On the pivot 20 there is also carried a manually-actuated floating lever 21 which is connected by a pivot 22 to a link 23, pivoted in turn to a brake lever 24 which is pivoted on a shaft 24a, the outer end of which is connected by a link 25 to a brake pedal 26 supported on a pivot 27 carried in a bracket on a floor-board 28. When pressure is applied to the brake pedal 26 the lever 21 is moved upon the pivot 20 as the reaction point and thence transmit the manual movement to a link 33 which has an adjustable pivotal support in a curved slot 34 at the end of said lever 21. The link 33, in turn, is connected to a lever 35 which is tight on a shaft 36 which is journaled in a rear booster housing 37, mounted by means of bolts 38 and 39 upon any desired part of the chassis. The said rear booster housing 37 is closed at the rear with a cover plate 43 secured thereon by screws 44 and the rear booster housing 37 is secured by screws 45 to a main booster housing 46 closed at the forward end thereof with a screw-cover 47.

The liquid for transmitting the boosting power is of any desired character, as, for example, the usual hydraulic brake fluid, but may, for instance, be comprised partly of castor oil, and preferably more castor oil for lubrication than in the usual hydraulic brake liquid, and in which there is carried a large amount of a constituent to prevent freezing under all atmospheric conditions, such, for example, as an alcohol. The alcohol added thereto also makes the liquid less viscous. This liquid is supplied under pressure by an inlet port 48 in the top of the main booster housing 46 and thence into a cylindrical chamber 49 therein in which a plunger 50 is arranged to reciprocate. The plunger 50 has an annular recess 51, the two ends of which are closed by sealing rings 52 and 53 which are of any desired composition, but preferably a rubber, and for this purpose there may be advantageously used what is known as "rosin rubber" such as is used in hydraulic brakes and which is unaffected by the liquid which conveys the power, as above referred to. It will be noted that each of these rings 52 and 53 has an outer sealing lip, or flange, 54, which prevents any leakage around the periphery of the same, but which, because of its small size, does not exert undue friction. Also, the inner portion of the ring is provided with a longer lip, or flange, 55 which retains the ring against the plunger 50 to prevent any leakage beneath the same. The flanges 54 and 55 are sealed by opposing radial pressures. Due to the opposed faces of the rings 52 and 53, the presence of the liquid in the annular space 49 will not move the plunger 50. From this point the liquid, under pressure, passes by a series of radiating ports 56 to an internal annular recess 57 in which there are two annular T-shaped sealing rings 58 and 59 of the same kind of rubber as above, carrying outer circular shoulders to prevent their entering the valve ports hereinafter described, said rings being clamped in place so as to produce effectively-sealing internal surfaces of a reduced area, by means of rings 60, 61 and 62 and a perforated spacing ring 63, with the aid of a hollow head sealing-ring clamping means 64 screw-threaded into the end of the plunger 50, the edges of the seals 58 and 59 being beveled on their innermost edges to permit the rubber to expand into the corners under pressure and so as to prevent the inner peripheries from exerting too much friction in the movement of the valve 67. In this way sticking is prevented. In the interior of the plunger 50 there is provided at the other end, a hollow screw-threaded plug 65 carrying a spring 66 therein which tends to press towards the rear a tubular valve 67 having a shoulder 68 to act as a stop against a shouldered bore 69, in which the tubular valve 67 reciprocates. Near the rear end of the tubular valve 67 there are a plurality of radiating ports 70 which communicate with a tapered inlet valve recess 71 leading to the exterior of the tubular valve and so as to establish communication with the annular space 57 when the valve 67 is moved forwardly. The forward movement of said valve 67 is accomplished manually by pressure exerted upon a movable closure in the form of a squared port-closing member 72, which is adapted to close an outlet valve port 72a, the rearmost end of which is smaller in area at the place where it contacts with the member 72 than the area at the forward end of the valve to prevent chattering. The over-balancing effect of the spring 66 also tends to prevent the chattering effect. The member 72 is operated by the movement of a squared plunger 73 held in the head 64 by a screw 74 and which has an operating stem 75 contacting with the end of a lever member 76 tight on the shaft 36. When the liquid under pressure is admitted to the interior of the tubular valve 67 by the forward movement of the latter, due to the movement of the lever 76 by the brake pedal, the recess 71 will be brought into communication with the annular recess 57 admitting the oil under pressure to the bore within the tubular valve 67 so that the pressure of the liquid will then be exerted through the opening in the closure 65 against the cover 47 at the front end of the booster and the pressure thus produced at the front end of the plunger 50 will cause said plunger to move rearwardly until the pressure on the plunger 50 has substantially equalized the pressure applied by the foot, it being understood that when this takes place the spring 66 will have closed the ports 70 by causing the sealing ring 59 to overlie the external cylindrical portion of the tubular valve 67, as shown in Fig. 4, inasmuch as the spring 66 exerts a slight pressure on the tubular valve 67 towards the right and the foot yields slightly to permit this. The pressure thus exerted on the plunger 50 by the liquid at the forward end thereof will be transmitted to a forked lever 77 which is carried by a sleeve 77a located around the shaft 36 and which sleeve 77a has tight thereon a lever 78 connected to the pivot 28 so that a boosting force will be applied to the brake operating link 19 connected to all of the wheels of the automobile, commensurate with the extent of the foot pressure applied by a pedal 26. A spring 78a on a stud 78b on the sleeve 77a tends to restore the levers 78 and 77 which have the same pivotal point at 36 to their initial positions and enables the lever 76 to be moved initially without moving the lever 77. To prevent leakage around the shaft 36 and the sleeve of the lever 77, said shaft 36 is journaled within the sleeve 77a on roller bearings and leakage at this end of the sleeve 77a is prevented by a flanged sealing ring 78 of the rubber material above referred to, and the same erd of the sleeve 77a is sealed by a similar sealing ring 78d around the sleeve 77a and within the housing 37. The other end of the sleeve 77a is journaled in a sealed socket in a cover plate 78e on one side of the housing 37. When it is desired to release the pressure from the brakes the decrease of the pressure on the pedal 26 will cause the release, partly or wholly, of the lever 76, thereby permitting the pressure liquid to spill out or escape past the squared plunger 73 to an outlet port 79 in the bottom of the rear housing 37, and thence to a tube 80 which leads to a low pressure port 81 in a pressure accumulator and supply reservoir 82, which is made of thin metal and has appurtenant parts as shown in detail in the parent Patent No. 2,136,638, above referred to. A supply reservoir 82 is mounted upon a pump casing 83 and is supported from any suitable part of the chassis. The low pressure liquid passes from the port 81 into the reservoir 82 and then to the pump casing 83, to the pump which is driven by an electric motor 100 from which it is supplied through an outlet port 115 by a flexible tube 116 to a branch tube 117 leading to the inlet port 48 of the booster. For the starting and stopping of the pump nuts 129 and 130 are provided between which the end of a circuit wire 131 is clamped.

The circuit arrangement, including the electric motor 100 and the switch, comprises a battery 155, one side of which is connected to the ground 156 and the other side of which is connected by a wire 157 and a wire 158 to one pole 159 of the motor 100. The wire 131 leads to the remaining pole 160 of the motor 100. Preferably, also, this pole 160 is connected by a wire 161 to a dash light 162 connected by a wire 163 to the wire 158, so that whenever the current is being supplied to the motor 100, due to the lightened pressure in the liquid, the dash light 162 will be illuminated. Inasmuch as only very little liquid is utilized in the operation of the accessory there is only a very little drop in the pressure at any time, and, therefore, the dash light 162 will only be illuminated at infrequent intervals. During the time when the valve 67 is in closed position there is no escape of the liquid whatever.

When it is desired to apply the mechanism to the operation of hydraulically controlled automobile accessories, this may be readily done, as shown in Fig. 8. In this construction the parts are all arranged exactly as previously described herein, except that in this instance the power output, or booster action, is not accomplished by mechanical connections merely. In this instance the lower ends of the levers 77, in actuating the brake, are connected by a link 164 to a piston 165 in a master cylinder 166 of the same type as customarily used in connection with hydraulic pressure systems, said cylinder 166 having an adapter 167, a supply chamber 168 with a supply port 169, and a leakage-return-port 170, and a spring support 171 which serves to retract the piston 165 as well as the levers 77. The cylinder 166 is connected by a hydraulic line 172 to a brake-operating line 173 leading to the front brake, which in this instance, it will be seen, are manually actuated as well as being boosted by the hydraulic pressure. In this instance the rear brakes can be operated by an hydraulic line 174 leading from a port 175 in the forward end of the booster cylinder 46, which end of the cylinder would be otherwise normally closed by a plug 176. The hydraulic line 174, for the operation of the rear brakes, may operate the same at the rear of the car in substantially the same fashion in which the wheel brakes in the front of the car would be operated, that is to say, by admitting the liquid under pressure to the cylinder 177 which operates a piston 178 connected to a lever 179 on the rear operating rod 12. However, if desired, instead of using a construction involving the cylinder 177 and the piston 178, I may mount on the brake bands of each of the wheels, either in the front or in the rear, or both, a double cylinder 180 having therein two pistons 181 and 182, which are connected, respectively, to brake shoes 183 and 184 so that the position of the brake shoes is controlled by the pressure supplied from the line 172, or whichever line is attached thereto.

In the operation of the apparatus, referring first to the operation of the brakes, when the pedal 26 is moved downwardly, this applies manual pressure to the brakes on the four wheels of the car through the lever 24, link 23, lever 21, link 19, levers 17, 15, 13, 14, and shafts 9 and 12, but this movement will also move lever 21 to the left in Fig. 2 and through the link 33 move the lever 35 and the lever 76 to the left in said figure, thus causing the tubular valve 67 to move inwardly to the left in said figure, thus communicating the high pressure liquid, which is normally under pressure of 500 lbs. per square inch, from the annular chamber 49 to the interior of the tubular valve 67 through the recess 71 and thence to the rear of the plunger 50, which will result in the movement of the plunger 50 to the right in said figure, thereby acting on the lever 77 to exert an additional pull on the brake rod 19 to the left in said figure. This pressure will increase until the pressure of the liquid at the left end of the tubular valve 67 in said figure exerted towards the right therein on the lever 76 equalizes the amount of the pressure applied by the foot to the pedal 26, whereupon the tubular valve 67 will close the high pressure inlet by a movement to the right in said figure due to the restoring movement of the lever 78 to the left in said figure acting through the link 21 to restore the tubular valve 67 to lap position with regard to the piston 50. When the foot pedal is released partially or wholly from the foot pedal 26, the liquid under pressure will escape around the closure 72 and thence through the outlet port 79 by reverse modulation, the same as in forward modulation of the tubular valve 67 movements. This low pressure liquid will pass into the reservoir 82 and thence, after being changed to a high pressure fluid, it is supplied to the port 48. Also, upon failure of the high pressure fluid the brakes can still be applied manually through the link 23, lever 21 and link 19. Whenever pedal pressure is released from the link 19 the levers and piston 50 are returned to normal position by the spring 18. The low pressure liquid proceeds to the pump, from which, when the current is on, the rotation of the pump will rapidly build up the pressure until the circuit is again broken. While the current is on, the dash light 162 will show up but as soon as the current is broken it will, of course, cease to be lighted.

The hydraulic system, as in Fig. 8, will operate in a similar manner also, except that in this instance the power, which acts alone, or which acts as a booster if desired, is conveyed by the tubes to the four-wheel brakes so that by the operation of the piston, such as 178, 181, 182, the various parts are actuated with modulated pressure from the force supplied by the foot to the pedal.

While I have described my invention above in detail I wish it to be understood that many changes may be made therein without departing from the spirit of the same.

I claim:

1. A device, comprising a plunger adapted to be moved by fluid under pressure differing from the atmosphere to apply power, a work-performing element associated therewith, a manually movable pressure liquid valve located there-within, said plunger having a spring support producing an increasing resistance to the movement of the plunger to produce an increasing reaction on the manually movable valve with the increasing pressure on the plunger, and manual operating means having a connection to said valve and a connection to said plunger so as to coordinate the travel of the plunger with the manual operating means.

2. A device comprising an actuator casing having a liquid inlet port, a piston actuator therein, a work-performing element associated therewith, an annular chamber on the interior of the actuator for receiving the liquid, and a T-shaped annular resilient sealing means at the opposite ends of said chamber, having an annular means for clamping each of the two sealing means so as to force at least a portion of each of them towards the interior of the actuator, said sealing means having areas on their interiors smaller than their exteriors.

3. A hydraulic apparatus for operating an automotive vehicle accessory, comprising a source of liquid under substantially uniform pressure, a manually movable lever member increasingly reactive to the increase of the liquid pressures applied thereby, an actuator, comprising a lever having the same pivotal point as said first mentioned lever and having a plunger associated therewith, for operating the accessory, said plunger being operable by said liquid pressure, a spring located between said levers, and a valve mechanism therefor operable by said member and connected to the source of substantially uniform pressure, including a movable modulating valve associated with said plunger and a movable valve seat, so as to thereby modulate the force exerted by the actuator in accordance with the force exerted by said member and the force of the pressure liquid admitted from said pressure source.

4. An apparatus according to claim 3, in which the valve comprises a laterally ported piston and the movable valve seat is comprised of a plunger having seals on opposite sides of said port.

5. A device, comprising a plunger adapted to be moved by fluid under pressure differing from the atmosphere to apply power, a work-performing element associated therewith, a manually movable tubular pressure liquid valve located there-within, said plunger having a spring support producing an increasing resistance to the movement of the plunger to produce an increasing reaction on the manually movable valve with the increasing pressure on the plunger, manual operating means having a connection to said valve and a connection to said plunger so as to coordinate the travel of the plunger with the manual operating means, and a spring located between the valve and plunger, said plunger having an annular liquid-receiving recess and said valve having a passageway communicating with said recess.

6. A device, comprising a plunger adapted to be moved by fluid under pressure differing from the atmosphere to apply power, a work-performing element associated therewith, a manually movable pressure liquid valve located there-within, said plunger having a spring support producing an increasing resistance to the movement of the plunger to produce an increasing reaction on the manually movable valve with the increasing pressure on the plunger, and manual operating means having a connection to said valve and a connection to said plunger so as to coordinate the travel of the plunger with the manual operating means, said plunger having an internal annular liquid-receiving recess and a T-shaped liquid sealing ring associated with said recess, said ring having a reduced inner area provided with annular means for clamping the two sides of said ring towards each other.

7. A device, comprising a body member, a plunger therein adapted to be moved by fluid under pressure differing from the atmosphere to apply power, a work-performing element associated therewith, a manually movable pressure liquid sliding tubular valve located there-within, said plunger having a spring support producing an increasing resistance to the movement of the plunger to produce an increasing reaction on the manually movable valve with the increasing pressure on the plunger, and manual operating means having a connection to said valve and a connection to said plunger so as to coordinate the travel of the plunger with the manual operating means, said valve having a pressure fluid inlet associated with the periphery of the sliding valve, said body member having a chamber at one end of the sliding valve to receive the pressure liquid from said valve, and said connection to said valve comprising a manually movable closure for the other end of said valve to control the release of the pressure liquid.

8. A device, comprising a plunger adapted to be moved by fluid under pressure differing from the atmosphere to apply power, a work-performing element associated therewith, a manually movable pressure liquid valve located there-within, said plunger having a helical compression spring support producing an increasing resistance to the movement of the plunger to produce an increasing reaction on the manually movable valve with the increasing pressure on the plunger, and manual operating means having a connection to said valve and a connection to said plunger so as to coordinate the travel of the plunger with the manual operating means.

9. A device, comprising a plunger adapted to be moved by fluid under pressure differing from the atmosphere to apply power, a work-performing element associated therewith, a manually movable pressure liquid valve means, including an inlet valve and an outlet valve, located there-within, said plunger having a spring support producing an increasing resistance to the movement of the plunger to produce an increasing reaction on the manually movable valve means with the increasing pressure on the plunger, and manual operating means having a connection to said valve means and a connection to said plunger so as to coordinate the travel of the plunger with the manual operating means.

10. A device, comprising a plunger adapted to be moved by fluid under pressure differing from the atmosphere to apply power, a work-performing element associated therewith, a manually movable pressure liquid valve means, including an inlet valve and an outlet valve, located there-within, said plunger having a spring support producing an increasing resistance to the movement of the plunger to produce an increasing reaction on the manually movable valve means with the increasing pressure on the plunger, and manual operating means having a connection to said valve means and a connection to said plunger so as to coordinate the travel of the plunger with the manual operating means, said valve means comprising a tubular valve member acting as the inlet valve and an end closure movable relatively to the tubular valve member acting as the outlet valve.

11. A device, comprising an actuator casing having a liquid inlet port, a plunger adapted to be moved by fluid under pressure differing from the atmosphere to apply power, having an annular chamber on the interior of the plunger for receiving the liquid with resilient sealing means for the opposite ends of the chamber, said sealing means having annular clamping means forcing the resilient sealing means toward the center, a work-performing element associated therewith, a manually movable pressure liquid tubular valve located there-within, said plunger having a spring support producing an increasing resistance to the movement of the plunger to produce an increasing reaction on the manually movable valve with the increasing pressure on the plunger, manual operating means having a connection to said valve and a connection to said plunger so as to coordinate the travel of the plunger with the manual operating means, and a spring located between the plunger and valve.

12. A device, comprising a plunger adapted to be moved by fluid under pressure differing from the atmosphere to apply power, a work-performing element associated therewith, a manually movable pressure liquid valve located there-within, said plunger having a spring support producing an increasing resistance to the movement of the plunger to produce an increasing reaction on the manually movable valve with the increasing pressure on the plunger, and manual operating means having a connection to said valve and a connection to said plunger so as to coordinate the travel of the plunger with the manual operating means, said valve having a passageway to admit the pressure liquid to one end of the plunger and having a member for controlling the escape of the pressure liquid at the other end thereof.

13. A device, comprising a plunger adapted to be moved by fluid under pressure differing from the atmosphere to apply power, a work-performing element associated therewith, a manually movable pressure liquid valve located there-within, said plunger having a spring support producing an increasing resistance to the movement of the plunger to produce an increasing reaction on the manually movable valve with the increasing pressure on the plunger, and manual operating means, including a floating lever, having a lever connection to said valve, a lever connection to said plunger, and a spring between said levers so as to coordinate the travel of the plunger with the manual operating means.

EDWARD A. ROCKWELL.